March 7, 1967  A. O. K. MACHOLD ET AL  3,307,623
DEVICE FOR RAPID MELTING OF SOLID MATERIALS
Filed Aug. 18, 1965  3 Sheets-Sheet 1
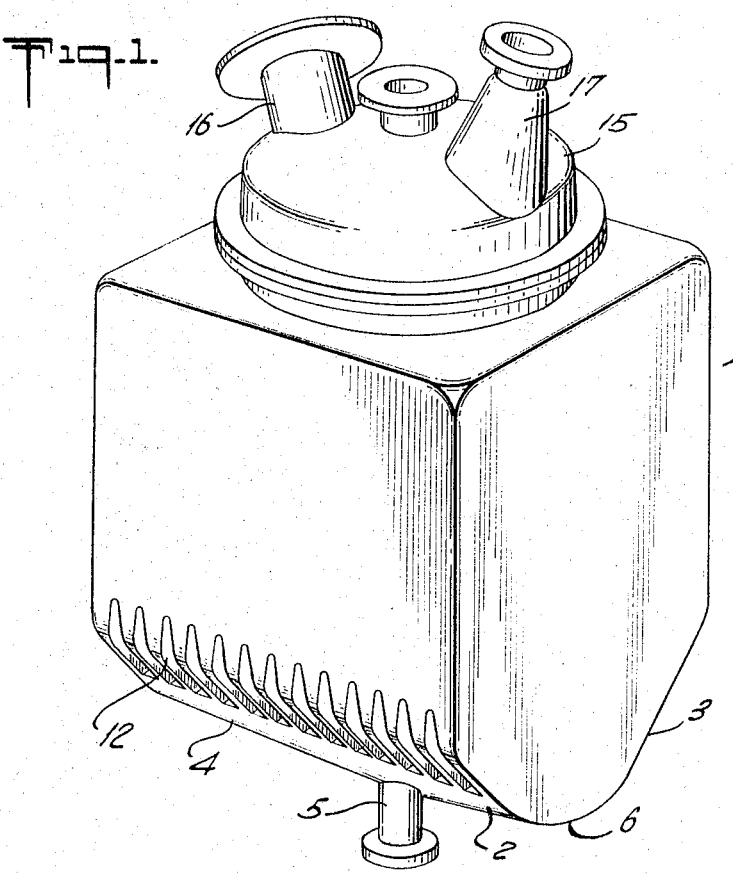
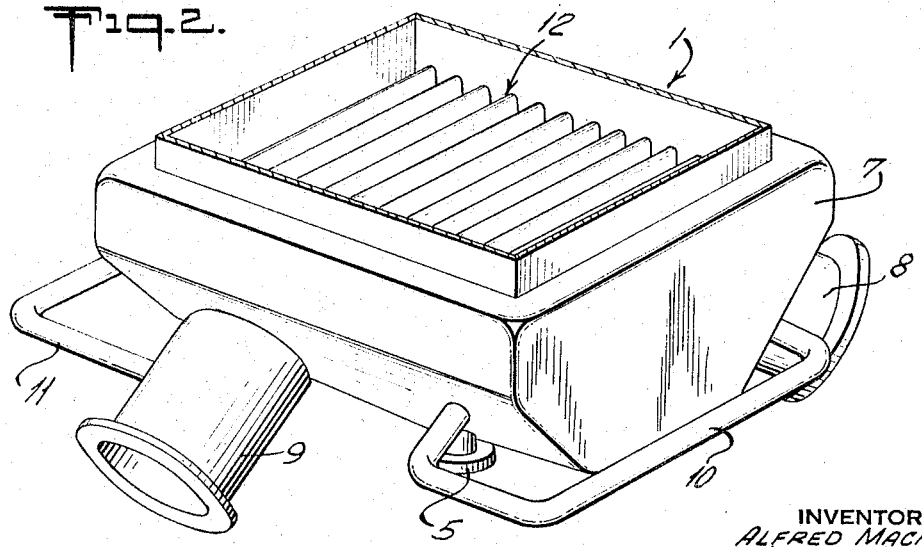
INVENTORS
ALFRED MACHOLD
WERNER NEHRING
HELLMUT RAMM

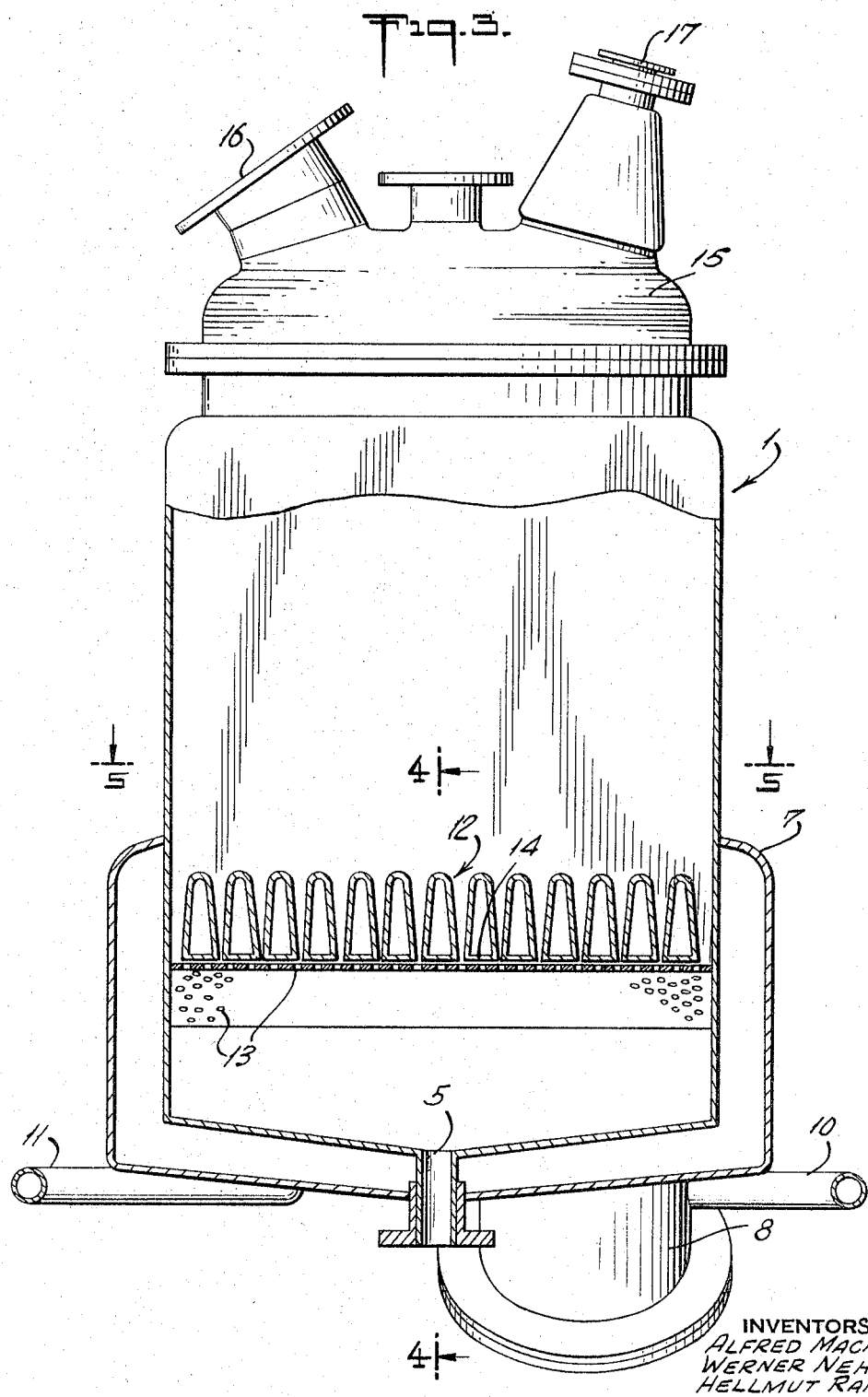

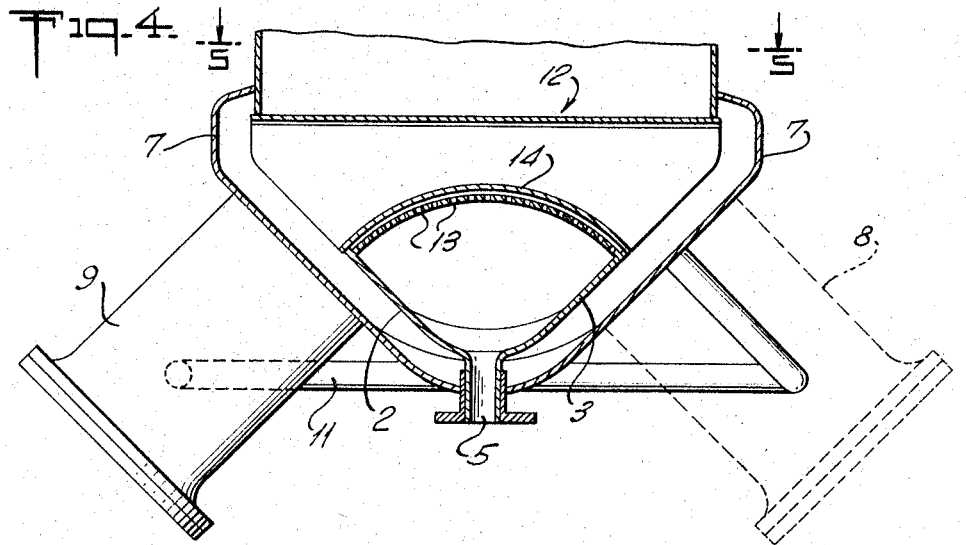
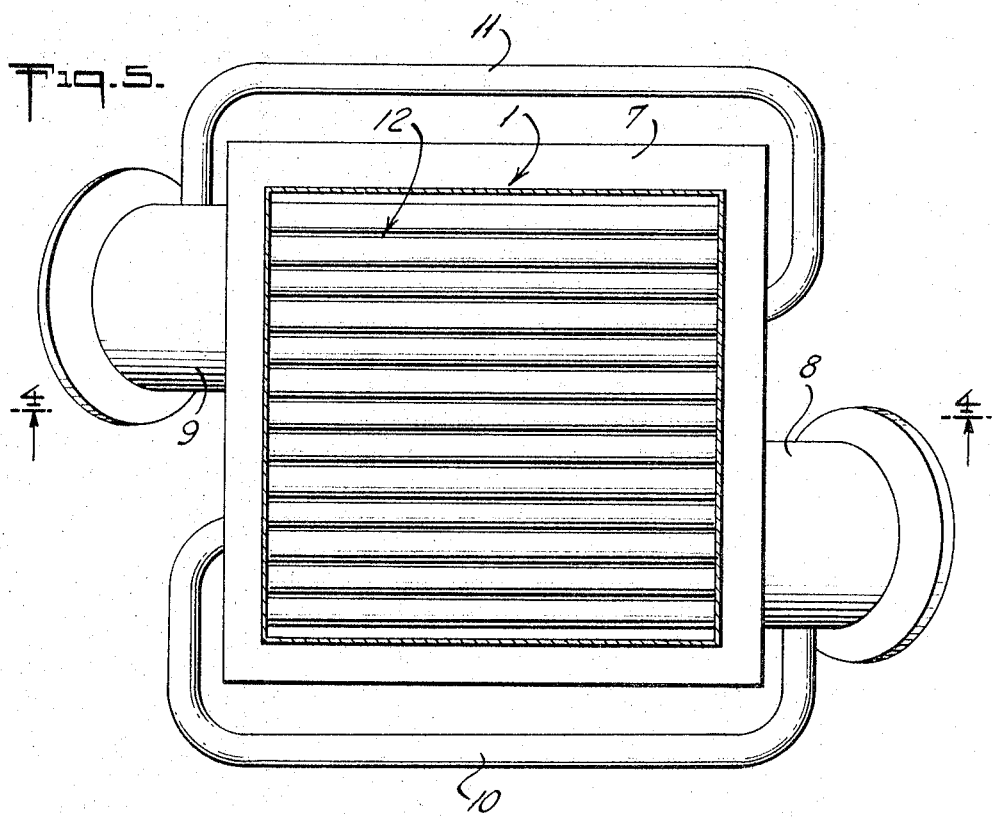

United States Patent Office 3,307,623
Patented Mar. 7, 1967

3,307,623
DEVICE FOR RAPID MELTING
OF SOLID MATERIALS
Alfred O. K. Machold, Bad Blankenburg, Werner A. W. Nehring, Teichel, and Hellmut A. Ramm, Rudolstadt, Germany, assignors to VEB Chemiefaserwerk Schwarza "Wilhelm Pieck," Rudolstadt, Germany
Filed Aug. 18, 1965, Ser. No. 480,672
8 Claims. (Cl. 165—169)

The present invention relates to a device for melting solids and for converting them into the liquid state.

As is well known, it does not infrequently happen in connection with certain processes that it becomes necessary to convert a solid into a liquid for the purpose of reacting it with additional substances. It is often essential to maintain the substance in the liquid state for an extremely short period of time since otherwise the relatively high temperature, at which the material must be maintained to remain in liquid form, will have an undesirable effect on the same.

For example, in the manufacture of fibers, yarns, or the like, it is necessary to melt terephthalic acid dimethyl ester in order to enable it to react with other substances. If the terephthalic acid dimethyl ester is maintained in its molten condition, necessarily at a relatively high temperature, for a comparatively long time, it will become discolored and is then no longer suitable for the manufacture of fibers, yarns and the like.

The terephthalic acid dimethyl ester is conventionally dissolved in hot glycol, and it is processed in a double-walled vessel. As a result, glycol vapors are produced which have access to the supply ducts through which the terephthalate reaches the glycol, consequently, the terephthalate becomes tacky and will cling undesirably to the supply structure through which it is passed to the glycol. As a result, the operation of the supply structure is impaired, and in fact its operation is often prevented as a result of clogging with the terephthlate which has been acted upon by the glycol vapors.

It is also known to convert solids into liquids in vessels having a suitable heating grid therein, and the molten material flows out of the bottom of such a container from where it is delivered to further devices for subsequent treatment. Devices of this latter type are known in the spinning art for the purpose of manufacturing structures from synthetic linear high polymers.

The present invention relates to a melting device of this type, but provides an improved structure which makes it highly suitable for the melting of solids which must be maintained in liquid state for only an extremely short period of time.

Thus, it is a primary object of the present invention to provide a device capable of efficiently melting solids while at the same time guaranteeing substantially instantaneous discharge of the molten liquid from the heating device to a further treating device, so that the material will be in liquid form for only an extremely short time.

Furthermore, it is an object of the present invention to provide a melting device of the above type which is capable of efficiently melting a solid material with the use of heat derived from a liquid which has a high boiling point.

It is yet another object of the present invention to provide a structure of the above type which is capable of reliably maintaining the heating liquid in circulation so as to provide an efficient heating action.

The invention relates to a vessel, which is generally square-shaped; two of the walls which are facing one another have inwardly inclined bottom portions meeting in a line, which in turn is sloping toward the center. At the lowermost point, a discharge tube communicates with the interior of the vessel, through which molten material is carried off from the vessel for further processing. A grid is arranged inside the vessel near the bottom end for heating a solid and forming the melt therefrom.

The lower portion of the vessel, approximately to the height of the grid, or somewhat higher, is surrounded by a heating jacket through which a liquid of high boiling point is made to circulate. The heating jacket is in direct communication with the grid which is hollow inside. For heating and introducing the heating liquid, and for discharging the same respectively, two heating tubes are provided on inclined opposite sides of the vessel, in staggered position, whereby the circulation and the heating action are promoted. For the same purpose, additional tubes may be arranged between the inlet or outlet tubes and the opposite side of the heating jacket. As heating liquids we preferably use diphenyl, diphenyl oxide or mixtures of both, but other liquids having high boiling points may also be used.

In the following, an embodiment of the device according to the invention will be more fully described with reference to the accompanying drawings, but it should be understood that these are given by way of illustration and not of limitation and that many changes may be made in the details without departing from the spirit of the invention.

In the drawings:

FIG. 1 is a perspective view of a melting device according to the invention, the structure being shown in this figure without the heating jacket;

FIG. 2 is a perspective view of the lower portion of the invention;

FIG. 3 is a side view of the device, the lower portion being in section;

FIG. 4 is a side view of the lower portion of the device in a section taken along line 4—4 of FIG. 3;

FIG. 5 is a top plan view of the lower portion of the device.

As may be seen from FIG. 1, the device of the invention is in the form of a vessel 1, which is generally square shaped. As shown in that figure, two of the opposing walls of the vessel have bottom portions 2 and 3, respectively, inclined toward one another and meeting with their bottom ends along a line 4. This line is sloping downwardly to a lowermost point, where a discharge means 5 communicates with the interior of the vessel.

As shown most clearly in FIGS. 3 and 4, the discharge means 5 may be in the form of a tube having an open top end for said communication with the interior of the vessel 1.

The oppositely inclined wall portions 2 and 3 which meet at the line 4 determine the bottom formation of the vessel; it may either be rounded, as indicated in FIG. 1, at 6; or, if desired, the oppositely inclined walls 2 and 3 may also meet at an angle, which is an obtuse angle as shown in FIG. 4.

As indicated in FIGS. 2–4, the inner wall of the vessel 1 supports in its lower portion an outer wall and the two walls define there between a heating jacket in which a liquid of high boiling point can be received. The outer wall 7 is generally of the same configuration as the inner wall and extends upwardly at least to the elevation of a grid means 12, although it is preferred to extend the outer wall to an elevation somewhat higher, as may be seen from FIGS. 3 and 4. The discharge tube 5 extends in fluid-tight connection through the outer wall 7 at the bottom end of the latter.

A pair of heating tubes 8 and 9 are carried by the outer inclined wall 7 so as to communicate with the interior of the heating jacket. It will be noted particularly from FIG. 5 that these heating tubes are out of alignment with one another so as to be offset with respect to each other, whereby better circulation of the heating liquid is achieved, when, during operation, both tubes are closed.

A pair of circulating pipes 10 and 11 are also provided to promote the circulation of the heating liquid. These circulating pipes 10 and 11 are connected to the heating tubes 8 and 9 respectively, on the one hand and to oppositely located inclined parts of the jacket, on the other hand. Thus, the heating pipe 10 which is connected to the heating tube 8 extends therefrom into communication with a part of the heating jacket, which is opposed to the location of the heating tube 8. In the same way, the circulating pipe 11 extends from the heating tube 9 to a part of the jacket which is opposed to the location of the heating tube 9. In this way, an efficient circulation of the heating liquid is further promoted.

The grid means 12 is made up of a row of elongated hollow elements which extend across the interior of the vessel and have opposed open ends which communicate with the heating jacket. As is apparent particularly from FIG. 3, the several grid elements 12 taper upwardly so that they define between them spaces which become gradually narrower in a downward direction; at their lower ends the elements are spaced slightly from each other so that only molten material which can flow through the narrow spaces between the elements will reach the discharge tube 5. The manner in which the opposed open ends of each grid element communicate with the heating jacket of the vessel is particularly apparent from FIG. 4 which also indicates how the lower end 14 of the several grid elements is curved so as to have a downwardly directed concave surface.

The ends of the grid elements 12 which abut the wall portions 2 and 3 are directly fixed thereto so that the material in the interior of the vessel cannot have any communication with the heating liquid which circulates not only in the jacket but also through the hollow grid elements 12. The several lower ends 14 of the grid elements 12 are located along and form part of a common cylinder.

Arranged directly beneath these lower ends 14 of the grid elements is a perforated plate 13 which extends along and forms part of a cylinder coaxial with that of which the lower ends 14 form a part, and the perforations of the plate 13 are small enough to guarantee that particles which are larger than a given size cannot have access to the discharge means 5. The upper ends of the grid elements 12 may be rounded, as shown in FIG. 3, or they may come to a sharp edge.

The device includes a removable cover 15 of any suitable construction, provided with inlet 16 for introducing a charge of solid material to be molten and sight glass 17 for observing. Venting means for escape of vapors evolved during the heating, means for measuring temperature etc. are not shown in the drawings. After the vessel has been charged, heating liquid is supplied and heated, respectively, by tube 8 or 9 so as to pass through the jacket and raise the temperature of the grid means 12, with the result that the solid material melts thereon. This material is preferably introduced in a suitable particulate form. As the material melts, it will flow from the grid through the perforated plate 13 to the discharge tube 5.

As a result of the above-described structure of the device of the invention, a very favorable flow and circulation of the heating liquid is achieved, as well as almost immediate discharge of the molten material from the device by means of discharge tube 5. Because of the extremely short time during which material in liquid form will remain at the grid 12, there can be no undesirable reactions and there are no areas where non-flowing liquid can remain to stagnate undesirably, so that harmful overheating will be positively avoided.

It is particularly to be noted that there will be no melting of materials along the inner surfaces of the side walls of the vessel 1, at the region between the grid 12 and the cover 15, since the outer wall 7 extends only up to the level of or slightly higher than the grid 12, so that melting of the solid particles is limited to that zone. If desired, however, additional cooling may be provided for the upper parts of the vessel.

To maintain the heating liquid at the required operating temperature, heating coils are provided inside tubes 8 and 9 of the type and in a manner known per se.

The heating device of the invention can be manufactured at extremely low costs. The use of a liquid for heating the solids in the vessel, permits an easy temperature adjustment between the melting point of the solid and the boiling point of the heating liquid.

The device of the invention is particularly suitable for melting of dimethyl terephthalate, in preparation for transesterification. The danger of sublimation is eliminated since the operation is carried out in such a way that the grid is constantly covered with the material during the melting thereof. The molten terephthalate is highly fluid so that it can easily be filtered and delivered in faultless condition to the converting vessel in which it is brought into reaction with glycol. The reaction time can in this way be considerably shortened so that the quality of the polycondensate is very much improved.

What we claim is:

1. A device for melting solid materials within a short period, and for practically immediate discharging of the molten mass to other processing devices, said melting device comprising a generally square-shaped vessel having four walls, inwardly inclined bottom portions meeting at their bottom ends in a line and extending from two of said walls which are in facing position with respect to one another, said line sloping from both ends toward the center of the bottom and forming a discharge opening for the molten mass at its lowermost point, a discharge tube for said mass attached to said opening, grid means arranged within said vessel near the bottom portion thereof for supporting and heating said solid materials to melting temperature and including grid elements which are spaced slightly from each other and define between themselves narrow spaces through which substantially only molten material can flow by gravity to reach said discharge tube, a heating jacket arranged along the bottom portion and connected to the outside of the vessel, said jacket extending upwardly to approximately the height of the grid means, said jacket and said grid means forming together a continuous passage for a heating liquid for circulation therethrough, means for heating and admitting and withdrawing, respectively, said heating liquid and circulating pipes arranged between said admitting means and said jacket for maintaining said liquid in circulation.

2. The device as claimed in claim 1 wherein said circulating pipes are respectively in communication with a pair of heated tubular means arranged in staggered position on the inclined bottom walls for admitting and withdrawing said heating liquid respectively, each circulating pipe extending from the heated tubular means with which it communicates to an inclined part of said jacket at the opposite side of the vessel, for communication with said jacket and for maintaining circulation of heating liquid through the system.

3. The device as claimed in claim 1 wherein said bottom end of said vessel is rounded along the line where said oppositely inclined portions of said facing walls meet.

4. The device as claimed in claim 1, wherein said grid includes a row of elongated grid elements extending across the interior of said vessel, said grid elements being hollow and each having opposed open ends communicating with said jacket, and said grid elements being tapered upwardly so as to define between themselves spaces which become gradually narrower in a downward direction, and having lower ends which are spaced from each other to permit the melt to drop from said grid elements to said discharge tube.

5. The device as claimed in claim 4, wherein said lower ends of said grid elements are curved and have downwardly directed concave surfaces.

6. The device as claimed in claim 5, wherein said concave surfaces together form part of a common cylinder.

7. The device as claimed in claim 6, wherein a perforated plate is carried by said vessel in the interior thereof just beneath said grid to prevent solid particles larger than a given size from reaching said discharge tube.

8. The device as claimed in claim 7, wherein said plate is curved along and forms part of a cylinder coaxial with the cylinder of which said lower ends of said grid elements form a part.

References Cited by the Examiner
UNITED STATES PATENTS

| | | | |
|---|---|---|---|
| 1,577,263 | 3/1926 | Kirk | 263—29 |
| 1,588,217 | 6/1926 | Winkelman | 263—29 |
| 1,713,237 | 5/1929 | Morin | 263—29 |
| 2,548,177 | 4/1951 | Tauber | 126—343.5 |
| 2,774,653 | 12/1956 | Cosmetto | 165—169 |
| 3,010,147 | 11/1961 | Davies et al. | 126—343.5 |

ROBERT A. O'LEARY, *Primary Examiner.*

M. A. ANTONAKAS, *Assistant Examiner.*